Nov. 1, 1927.
C. C. WAIS
1,647,205
PNEUMATIC TIRE FOR VEHICLE WHEELS
Filed Aug. 3, 1922   3 Sheets-Sheet 1
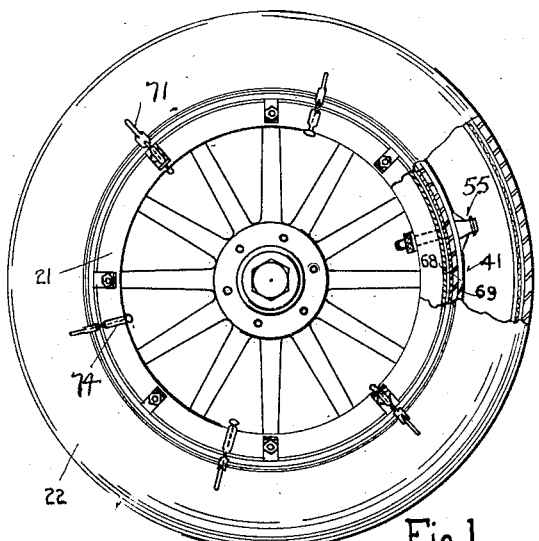
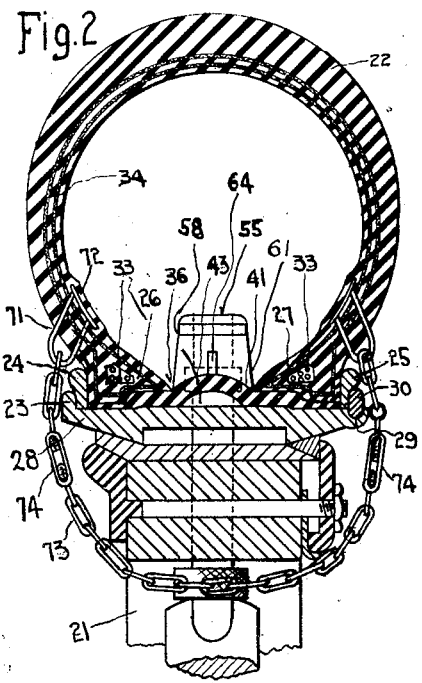
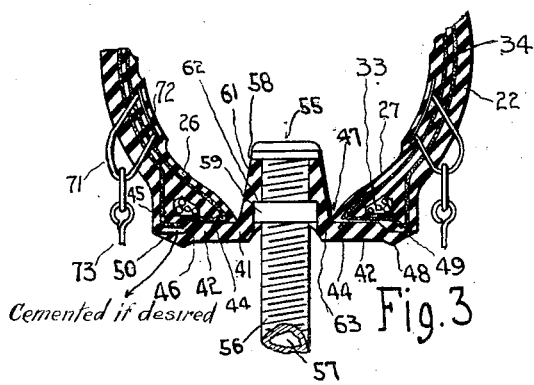
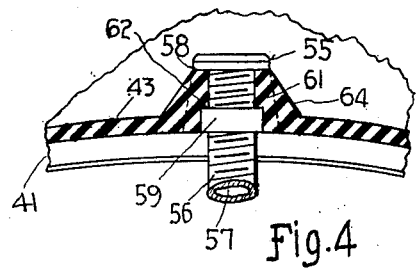
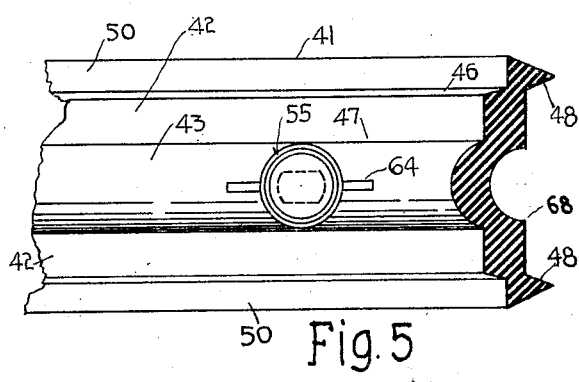

Nov. 1, 1927. 1,647,205
C. C. WAIS
PNEUMATIC TIRE FOR VEHICLE WHEELS
Filed Aug. 3, 1922 3 Sheets-Sheet 2
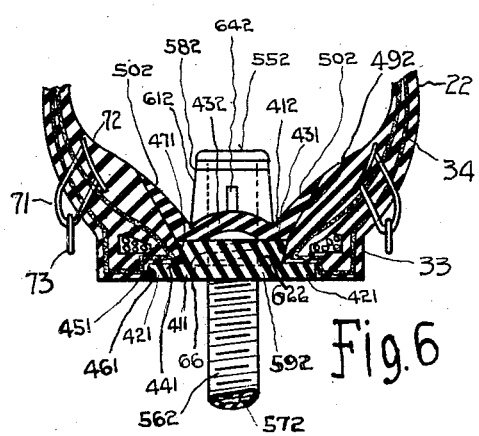
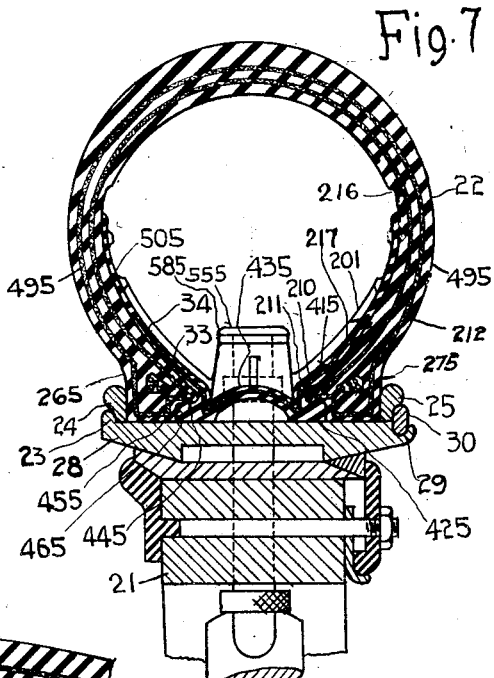
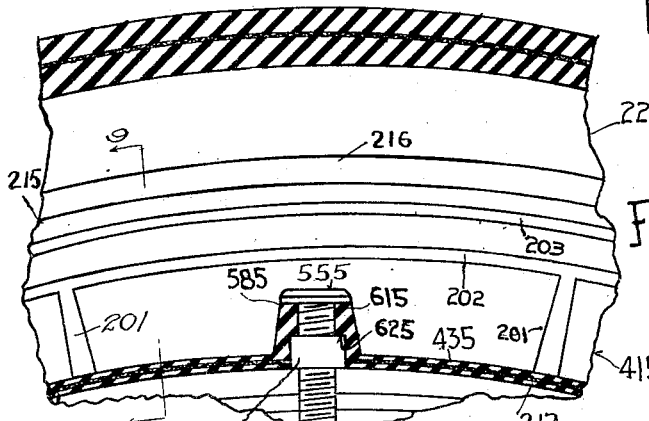
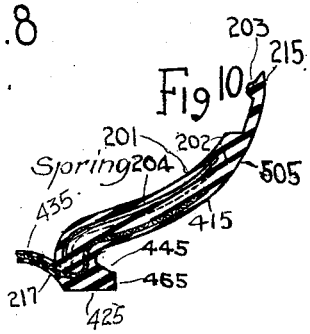
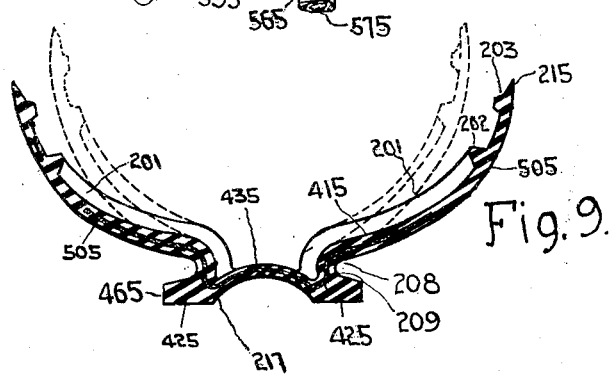

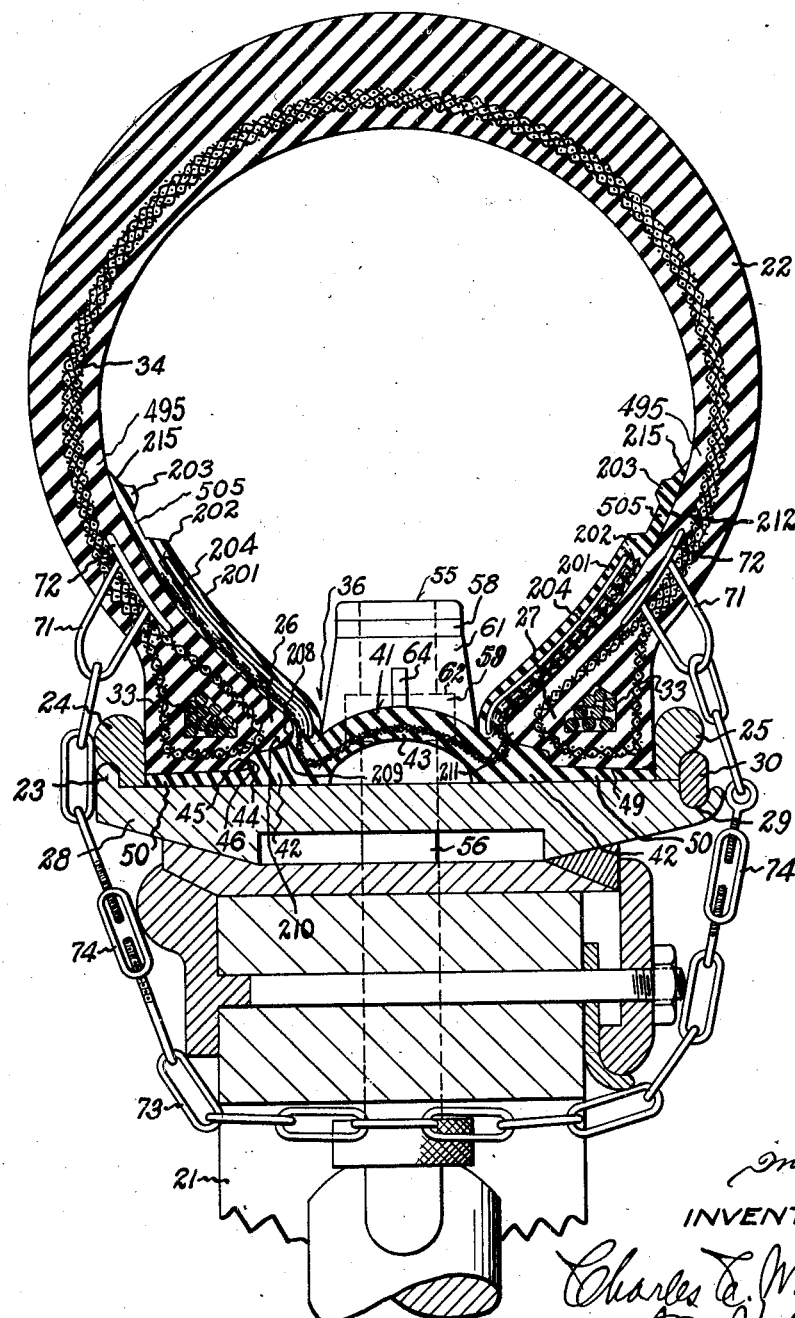

Patented Nov. 1, 1927.

1,647,205

UNITED STATES PATENT OFFICE.

CHARLES C. WAIS, OF CINCINNATI, OHIO, ASSIGNOR OF ONE-HALF TO ALBERT C. WAIS, OF WYOMING, OHIO.

PNEUMATIC TIRE FOR VEHICLE WHEELS.

Application filed August 3, 1922. Serial No. 579,434.

My present application is a continuation in part of a copending application heretofore filed by me in the United States Patent Office August 12, 1920, as Serial No. 403,090, for vehicle wheels.

It is the object of my invention to provide a cushion tread for a vehicle wheel comprising a tread-member of novel construction and arrangement whereby an inner tube for inflating the same may be dispensed with; further, to provide novel closing means for a cushion tread-member; further, to provide such closing means with a novel yieldable portion so arranged that, upon inflation of the tread-member, the base portions thereof at the respective sides of the tread-member are pressed laterally by the closing member into firm contact with the tire supporting means; further, to provide novel annular closing means between the bases of the tread-member comprising annular resilient wings normally spread a greater distance than their distance of spread when in the tread-member; and, further, to provide an annular closing member of novel construction arranged to be received between the bases of a tread-member of the tire and so arranged that intimate union between the annular closing member and the tread-member is provided at the outside as well as at the inside of said tread-member.

The invention will be further readily understood from the following description and claims, and from the drawings, in which latter:

Fig. 1 is a side elevation of a vehicle wheel partly broken away, embodying my invention.

Fig. 2 is a cross-section of the same, shown applied to the body of the wheel, partly broken away.

Fig. 3 is a cross-sectional detail of my improved device.

Fig. 4 is a central circumferential section of a detail of the same.

Fig. 5 is a plan view detail of the closing strip.

Fig. 6 is a cross-sectional detail, showing a modification of my improved device.

Fig. 7 is a cross-sectional detail, showing a further modification of my improved device.

Fig. 8 is a central longitudinal section of a detail of the same; and,

Fig. 9 is a cross-section of the closing member, shown in Figs. 7 and 8, taken in the plane of the line 9—9 of Fig. 8, and shown in normal or unflexed relation in full lines, and in flexed relation in dotted lines.

Fig. 10 is a cross-section of the closing member, partly broken away, taken in the plane of one of the radial ribs.

Fig. 11 shows the same parts as Figs. 2, 7 and 10 combined in a single figure.

21 represents the body of the vehicle wheel. 22 represents the tread-member of the tire. The tread-member is received about the body of the vehicle wheel and is confined thereon by any of the usual well-known fastening means, exemplified as a detachable demountable mechanism.

In the form shown, the tread-member is held in place by means of annular flanges 24, 25, which coact with the annular bases 26, 27, of the tread-member. The bases may be in the form of beads. The annular flange 24 is an integral ring held in place by an annular flange 23 integral with an annular rim 28, which forms an annular supporting band, suitably secured to the body of the vehicle. The annular rim is provided with an annular groove 29, in which an annular split-ring 30 is received. The annular flange 25 is on an annular integral ring, which is held about the rim 28 by means of the split-ring 30.

The bases are provided with usual annular strengthening rings 33 of wire or other suitable material and the usual webbing 34 in annular arrangement in the inside of the bases.

The annular tread-member of the tire has on it the annular bases 26, 27. The bases are normally separated by an annular space 36. An annular closing member, shown as a closing strip, preferably of rubber, is arranged to close this space. It preferably has an inwardly extending annular projection extending into the space. The inwardly extending annular projection is arranged to resist contraction and to accommodate any enlargement of the space between the bases of the tread-member.

Referring to Figs. 1 to 5, inclusive, the closing member is exemplified as an annular strip 41, having lateral portions 42 which extend between the bases and the rim, the strip being provided with an annularly arranged bulge 43, between the bases. The bases are provided with rabbets 44, forming shoulders 45, the strip being provided with complemental shoulders 46, the inner annular edges of the respective bases coacting with the shoulders 47 formed by the bulge to resist approach between the bases.

Each side of the closing strip is also preferably provided at its inner periphery with an annular projection 48, projecting toward the center of the wheel, preferably under the radially extending annular projection 49 or bottom of the base. The annular projections 48, (see Fig. 3) are, when the tread-member is placed upon its support (see Fig. 2), arranged to be compressed, so as to firmly close any space there may be in the joint between the closing strip and the bases to close the space in the inside of the tread-member and prevent the escape of compressed air which may be in the tread-member, when inflation is employed. If desired, the flaps 50 at the respective sides of the closing strip taper toward their outer edges, so as to form comparatively thin edges, and the flaps may be cemented to the bases along the meeting faces between the flaps or closing strips and the bases.

If desired, means may be provided for pneumatic pressure in the tread-member, supplied by a usual valve 55, comprising a threaded valve-stem 56 having a bore 57 therethrough, through which air is pumped into the tread-member, the valve-stem having an annular shoulder 58 at its inner end and having a nut 59 coacting with the threads on the outside of the valve-stem. The closing strip is provided with a rubber tube extension 61, having an annular shoulder 62, the valve-stem being held thereto between the annular shoulder 58 and the nut on the valve-stem. The side walls of the tube portion of the elastic closing strip, at the base of the tube portion, are sufficiently thin, as shown at 63, to permit separation of the base portion of the closing member at said tube portion, to allow for separation between the bases of the tread-member at said valve. Ribs 64, extending lengthwise of the closing member, aid in supporting the tube portion on said strip, the said ribs being integral with said strip and said tube portion.

Referring to Fig. 6, a compound closing member is shown, comprising an outer annular closing section 411 having lateral portions 421 which extend between the bases and the rim, the outer closing section being provided with an annularly arranged inward projection 431 between the bases. The bases are provided with rabbets 441 forming shoulders 451. The annular closing section 411 is provided with complemental shoulders 461. The inner edges of the respective bases coact with the shoulders 471, formed by the inwardly extending annular projection 431, to resist approach between the bases.

An inner annular closing section 412 is received between the bases, about the outer annular closing section 411. The closing section 412 is provided with an annularly arranged bulge 432 between the bases, and with lateral annular wings 502, forming flaps at the respective sides of the closing section, which preferably taper toward their margins so as to form comparatively thin edges. The flaps lie upon lateral outwardly sloping diverging walls 492, forming seats therefor, to form air-tight joints. The parts are so arranged that compressed air in the inside of the tread-member will cause pressure upon said flaps against said seats, for more firmly seating the flaps upon said seats and preventing leakage past the same, when such compressed air is employed in the tread-member.

When such compressed air is to be employed in the tread-member, there is a usual valve 552 provided, comprising a threaded valve-stem 562 having a bore 572 therethrough, through which air is pumped into the tread-member, the valve-stem having an annular shoulder 582 at its end, and a nut 592 coacting with the threads on the outside of the valve-stem. The inner closing section is provided with a rubber tube extension 612, and the outer closing section is provided with an inner annular shoulder 622. The valve stem is held to said tube extension between said annular shoulder 582 of the valve and the nut 592. Ribs 642 extend lengthwise of the closing strip, similarly to the ribs 64. The valve-stem passes through a hole 66 in the outer closing section and into said tube extension.

The closing members 41 may be provided with bevel ends 68, 69, (see Fig. 1), these bevel ends being cemented or vulcanized together for forming the closing strip as an integral annular structure. Each of the closing members herein described is provided with similar bevel ends similarly secured.

If it is desired to employ the closing member without cementing or vulcanizing the same to the bases, I prefer to employ additional means for holding the tread-member to the felly. Such additional means are exemplified as rings 71, provided with inner disks 72, fixed rigidly thereto, the whole being vulcanized into the tire at the respective sides thereof so as to have outwardly projecting ends. Tension means connect with these outwardly projecting ends for holding and clamping the respective bases to the rim, exemplified as a chain 73, at the respective ends of which there are turn-buckles 74, to firmly clamp the respective bases of the tire to their annular support on the body of the wheel. A suitable number of these securing devices may be arranged about the wheel, for instance, six of the same.

Referring now to Figs. 7, 8 and 9, I have shown the closing member as comprising an outer flange portion and an inner wing portion, the portions being integral with each other and being received respectively around the inner periphery of the thread-member and within the tread-member.

In this form of my invention, the annular closing member 415 comprises lateral portions 425 which extend between the bases 265, 275, of the tread-member and the rim 28.

The closing member 415 is provided with an annularly arranged inward projection 435 between the bases, shown formed with an inward bulge.

The bases are provided with rabbets 445 for forming shoulders 455, the closing member 415 being provided with complemental shoulders 465.

This closing member or strip is provided with laterally extending annular wings 505, forming flaps at the respective sides of the closing member, which preferably taper toward their margins so as to form comparatively thin edges. These flaps preferably bulge outwardly in cross-section. They lie against or are supported by the side walls 495, of the tread-member and form intimate connection therewith so as to form air-tight joints between the same.

These laterally extending wings are preferably normally spread to greater extent than the extent of spread or distance between the inner faces of the side walls of the tread-member, for instance, as indicated in Fig. 9, wherein the closing member is shown cross-sectionally in normal relation in full lines. When the parts are assembled, the distance between the free ends of the wings is reduced to cause pressure between the wings and the inner faces of the side walls of the tread-member when the closing member is received within the tread-member, as shown in Fig. 7, and indicated in dotted lines in Fig. 9.

In order to enhance the pressure between the wings of the closing member and the side walls of the tread-member, and to aid in forming a tight joint between them, and to aid in the proper association of the parts, I prefer to provide the inner faces of said wings with ribs 201, shown as extending substantially radially with relation to the tread-member, these ribs being preferably recurrent, for instance, every four inches at the inside faces of the wings.

I further prefer to provide the wings with annular ribs adjacent their free ends, such ribs being shown at 202 and 203. The ribs 202 are shown as connecting with the ribs 201.

In order to further aid in forming a tight joint between the coacting faces of the closing member and the tread-member, I desirably imbed springs 204 in the ribs 201. These springs may be formed of resilient wire.

I provide the laterally outer face of the closing member at each side of the closing member with an annular recess 208, preferably having a rounded bottom 209. I prefer to provide each base of the tread-member with an annular projection 210, which forms the rabbet 445 and provides an annular rounded bead 211 which is received in the annular recess 208 having the rounded annular bottom 209. The inner face of the base of the tread-member and the side wall thereof is laterally curved as shown at 212, the opposite laterally curved faces being less apart than the normal spread between the wings.

The outer edges of the wings are preferably tapered to comparatively thin annular lips 215 for being readily pressed toward their coacting walls for forming tight joints. The lateral walls of the tread-member are preferably provided with inner annular rabbets 216 in which the outer ends of the wings are received.

The wings lie upon the laterally outwardly sloping diverging walls 212, which form seats therefor, to form air-tight joints, and are so arranged that compressed air in the inside of the tread-member will cause pressure upon said wings against said seats for more firmly seating the wings upon said seats and preventing leakage past the same, when compressed air is employed in the tread-member. Furthermore, there is pressure upon the lateral flanges 425 between the inwardly extending annular projections 210 and the rim 28, as well as between the inner rounded ends 211 of the inward projections 210 and the bottoms 209 of the annular recesses 208 in the closing member, for forming a tight joint between the closing member and the tread-member. The curved forms of the mating faces permit flexure of the wings for securing and maintaining tight joints.

When it is desired to employ pressure in the tread-member, a usual valve 555 is provided, comprising a threaded valve-stem 565 having a bore 575 therethrough, through which air is pumped into the tread-member, the valve-stem having an annular shoulder 585 at its end and a nut 595 coacting with the threads on the outside of the valve-stem.

The closing member is provided with a rubber tube extension 615 and an outer annular shoulder 625. The stem of the valve is held to said tube extension between said annular shoulder 585 of the valve and the nut 595.

My invention provides ready and simple means whereby inflation of the tread-member may be accomplished without the employment of an inner tube; provides simple and effective means whereby an air-tight joint is provided for the tread-member, and whereby renewal and interchange of parts may be readily had.

The closing member and the tread-member may, if desired, be cemented along their joints, or throughout a portion of the width of the same, or at the base of the same, to aid in releasably securing the joint, for permitting the parts to be disconnected if it is desired to renew or interchange one or both of the members.

I prefer further that the closing member shall have a fabric 217 imbedded therein. This fabric extends integrally across the inward bulge and throughout a substantial part at the width of the side wings and extends annularly throughout the closing member.

Having thus fully described my invention, what I claim as new and desire to secure by Letters Patent, is:

1. The combination with a rim, of a tire for a vehicle wheel comprising an annular hollow tread-member having bases, and an annular closing member for closing the hollow of said tread-member at said bases comprising an annular inward bulge between said bases and laterally extending annular wings connected at their converging annular edges by said bulge and free of connection with each other at their diverging annular edges, said annular inward bulge having an open channel between said wings, the open face whereof is presented toward said rim and closed to said hollow, said wings pressed toward opposite walls of said annular hollow by pressure within said hollow.

2. In a vehicle wheel, the combination of an annular tread-member having annular bases, an annular support for said bases, said annular bases provided with inner annular rabbets presented laterally toward each other and a resilient compressible rubber closing member provided with annular resilient laterally outwardly presented compressible portions received in said rabbets, said closing member having an inward bulge closed to the hollow of said tread-member and located between said last-named compressible portions to compress said latter portions by pressure in said tread-member against said bulge.

3. In a vehicle wheel, the combination of an annular tread-member having annular bases, an annular support for said bases, means for limiting sidewise separation between said bases, and an annular closing member connecting said bases and having lateral extensions provided with annular enlargements spaced from the inner ends of said lateral extensions and located in the hollow of said tread-member on the inner faces of said lateral extensions, and said lateral extensions acted on by pressure in said hollow for compressing the joints between said closing member and said bases and between said bases and said annular support.

4. A tire for a vehicle wheel comprising an annular hollow tread-member having bases, and an annular closing member for closing the hollow of said tread-member at said bases, said annular closing member provided with side annular recesses and said bases provided with complemental annular projections received within said recesses, said annular closing member provided with laterally extending wings received in the hollow of said tread-member and coacting by pressure with the walls of said hollow, said laterally extending wings provided at their inner faces with laterally extending ribs and with ribs extending lengthwise of said wings.

5. The combination with a rim, of a tire for a vehicle wheel comprising an annular hollow tread-member having bases, and an annular closing member for closing the hollow of said tread-member at said bases, said annular closing member comprising an annular bulge between said bases open toward said rim, laterally extending flanges at the inner peripheries of said bases, and laterally extending diverging wings complemental to the opposite walls of said hollow adjacent to said bases, the inner faces of said laterally extending diverging wings provided with resilient ribs.

6. The combination with a rim, of a tire for a vehicle wheel comprising an annular hollow tread-member having bases, and an annular closing member for closing the hollow of said tread-member at said bases, said annular closing member comprising an annular bulge between said bases open toward said rim and closed to the hollow of said tread-member, laterally extending flanges at the inner peripheries of said bases, and laterally extending diverging wings complemental to the opposite walls of said hollow adjacent to said bases, said wings provided with resilient ribs at their inner faces.

7. A tire for a vehicle wheel comprising an annular hollow tread-member having bases, and an annular closing member for closing the hollow of said tread-member at said bases, said annular closing member comprising an annular bulge between said bases, laterally extending flanges at the inner peripheries of said bases, and laterally extending diverging wings complemental to the opposite walls of said hollow adjacent to said bases, said wings provided with resilient ribs at their inner faces, and said ribs having strengthening wires imbedded therein.

8. In a vehicle wheel, the combination of an annular hollow tread-member having annular bases which are separated laterally to form an annular space between said bases, an annular support for said bases, an annular closing member for closing said annular space, said annular closing member having lateral extensions extending between said bases and said annular support, and tension means extending from said tread-member and acting on said annular support to compress said lateral extensions of said annular closing member between said bases and said annular support.

In testimony whereof, I have hereunto signed my name.

CHARLES C. WAIS.